US009868397B2

(12) United States Patent
Maeda et al.

(10) Patent No.: US 9,868,397 B2
(45) Date of Patent: Jan. 16, 2018

(54) DISPLAY CONTROL DEVICE, AND DISPLAY CONTROL METHOD

(71) Applicant: DENSO CORPORATION, Kariya, Aichi-pref. (JP)

(72) Inventors: Masahito Maeda, Kariya (JP); Yasunori Suzuki, Chiryu (JP); Kiyohiko Sawada, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/889,292

(22) PCT Filed: May 12, 2014

(86) PCT No.: PCT/JP2014/002482
§ 371 (c)(1),
(2) Date: Nov. 5, 2015

(87) PCT Pub. No.: WO2014/185045
PCT Pub. Date: Nov. 20, 2014

(65) Prior Publication Data
US 2016/0090042 A1 Mar. 31, 2016

(30) Foreign Application Priority Data
May 14, 2013 (JP) .................. 2013-102313

(51) Int. Cl.
*B60R 1/00* (2006.01)
*G07C 5/06* (2006.01)
(Continued)

(52) U.S. Cl.
CPC ............... *B60R 1/00* (2013.01); *B60K 35/00* (2013.01); *G06F 8/61* (2013.01); *G07C 5/06* (2013.01);
(Continued)

(58) Field of Classification Search
CPC .................. G07C 5/0825; G07C 5/12
See application file for complete search history.

(56) References Cited

U.S. PATENT DOCUMENTS 7,895,296 B1 2/2011 Dayan
8,335,817 B1 12/2012 Dayan
(Continued)

FOREIGN PATENT DOCUMENTS

JP 2001306339 A 11/2001
JP 2006309664 A 11/2006
(Continued)

OTHER PUBLICATIONS

English translation of JP 2006-309664 A.*
(Continued)

*Primary Examiner* — Redhwan k Mawari
*Assistant Examiner* — Anshul Sood
(74) *Attorney, Agent, or Firm* — Harness, Dickey & Pierce, P.L.C.

(57) ABSTRACT

A display control device for controlling a display unit in a vehicle, including a dedicated middleware that executes a program on a vehicle side, a general purpose middleware that executes general purpose application programs from an external of the vehicle, and an interface that exchanges necessary information between the dedicate middleware and the general purpose middleware, includes: an acquisition device that acquires vehicle information on a dedicated middleware side; a notification device that notifies a general purpose middleware side through the interface of a vehicle status based on the vehicle information; and an activation device that activates, on the general purpose middleware side, a target application program for realizing the display corresponding to the vehicle status among the general purpose application programs based on the vehicle status.

7 Claims, 5 Drawing Sheets

(51) Int. Cl.
*G06F 9/445* (2006.01)
*B60K 35/00* (2006.01)
*G07C 5/08* (2006.01)

(52) U.S. Cl.
CPC ...... *G07C 5/0825* (2013.01); *B60K 2350/352* (2013.01); *B60R 2300/80* (2013.01)

(56) References Cited

U.S. PATENT DOCUMENTS

| | | | |
|---|---|---|---|
| 2008/0313282 A1 | 12/2008 | Warila et al. | |
| 2011/0107349 A1* | 5/2011 | Kishita | G06F 9/44 |
| | | | 719/313 |
| 2012/0136503 A1 | 5/2012 | Schunder | |

FOREIGN PATENT DOCUMENTS

| | | | |
|---|---|---|---|
| JP | 2008310499 A | 12/2008 | |
| JP | 2012010287 A | 1/2012 | |
| JP | 2012099924 A | 5/2012 | |
| JP | 2012162140 A | 8/2012 | |
| JP | 2013062734 A | 4/2013 | |

OTHER PUBLICATIONS

International Search Report and Written Opinion (in Japanese with English Translation) for PCT/JP2014/002482, dated Jul. 29, 2014; ISA/JP.
U.S. Appl. No. 14/889,294, filed Nov. 5, 2015, Matsuyama et al.

* cited by examiner

DISPLAY CONTROL DEVICE, AND DISPLAY CONTROL METHOD

CROSS REFERENCE TO RELATED APPLICATIONS

This application is a U.S. National Phase Application under 35 U.S.C. 371 of International Application No. PCT/JP2014/002482 filed on May 12, 2014 and published in Japanese as WO 2014/185045 A1 on Nov. 20, 2014. This application is based on and claims the benefit of priority from Japanese Patent Application No. 2013-102313 filed on May 14, 2013. The entire disclosures of all of the above applications are incorporated herein by reference.

TECHNICAL FIELD

The present disclosure relates to a display control device, a display control method, and a program for controlling a display of a display unit mounted on a vehicle.

BACKGROUND ART

In recent years, with the spread of a mobile terminal, a variety of proposals that an in-vehicle device is cooperated with the mobile terminal has been made. An application program (hereinafter referred to as "application") of the in-vehicle device operates on an operating system (hereinafter referred to as "OS") for only a vehicle. On the other hand, an application of the mobile terminal operates on a general purpose OS, is high in frequency of release, and easy to delete or add. Up to now, the in-vehicle device where in the case where the mobile terminal is connected to the in-vehicle device, when an application at the time of a previous connection is not present in the mobile terminal, the application of the same type is determined and activates has been proposed (for example, refer to Patent Literature 1).

However, when the mobile terminal is connected to the in-vehicle device, the connection is performed according to a short-range communication standard. However, undeniably, a failure may occur in a data communication due to a disturbance factor.

PRIOR ART LITERATURES

Patent Literature

Patent Literature 1: JP-2012-99924

SUMMARY OF INVENTION

It is an object of the present disclosure to provide a display control device, a display control method, and a program which executes cooperating with a general purpose application.

According to a first aspect of the present disclosure, a display control device for controlling a display of a display unit mounted in a vehicle, including a dedicated middleware that executes a program prepared on a vehicle side, a general purpose middleware that executes a plurality of general purpose application programs delivered from an external of the vehicle, and an interface that exchanges necessary information between the dedicate middleware and the general purpose middleware, includes: an acquisition device that acquires vehicle information associated with the vehicle on a dedicated middleware side; a notification device that notifies a general purpose middleware side through the interface of a vehicle status based on the vehicle information acquired by the acquisition device; and an activation device that activates, on the general purpose middleware side, a target application program for realizing the display corresponding to the vehicle status among the general purpose application programs based on the vehicle status notified by the notification device.

As described above, because not only the dedicated middleware but also the general purpose middleware for executing the general purpose applications delivered from the external are mounted on the display control device, the general purpose applications high in the frequency of release, and easy to delete or add can be used without connection to the mobile terminal, unlike the conventional art. Because the interface is interposed, no failure occurs in the data communication due to the disturbance factor. Further, only the exchange of necessary information can be performed due to the interposition of the interface, and is advantageous in security. Further, the display control device mounted on the vehicle can cooperate with the general purpose application.

According to a second aspect of the present disclosure, a program provides to function a computer as each device in the display control device according to the first aspect.

In the above program, the general purpose applications high in the frequency of release, and easy to delete or add can be used without connection to the mobile terminal. Because the interface is interposed, no failure occurs in the data communication due to the disturbance factor. Further, only the exchange of required information can be performed due to the interposition of the interface, and is advantageous in security. Further, the display control device mounted on the vehicle can cooperate with the general purpose application.

According to a third aspect of the present disclosure, a display control method for controlling a display of a display unit mounted on a vehicle, includes: acquiring vehicle information associated with a vehicle by a dedicated middleware that executes a program prepared on a vehicle side; notifying a general purpose middleware, which executes a plurality of general purpose application programs delivered from an external of the vehicle, of a vehicle status based on the vehicle information through an interface; exchanging necessary information between the dedicated middleware and the general purpose middleware through the interface; and activating a target application program, by the general purpose middleware, for realizing the display corresponding to the vehicle status among the general purpose application programs based on the vehicle status.

In the above display control method, the general purpose applications high in the frequency of release, and easy to delete or add can be used without connection to the mobile terminal. Because the interface is interposed, no failure occurs in the data communication due to the disturbance factor. Further, only the exchange of required information can be performed due to the interposition of the interface, and is advantageous in security. Further, the display control device mounted on the vehicle can cooperate with the general purpose application.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, an embodiment of the present disclosure will be described with reference to the drawings.

Figure 1:
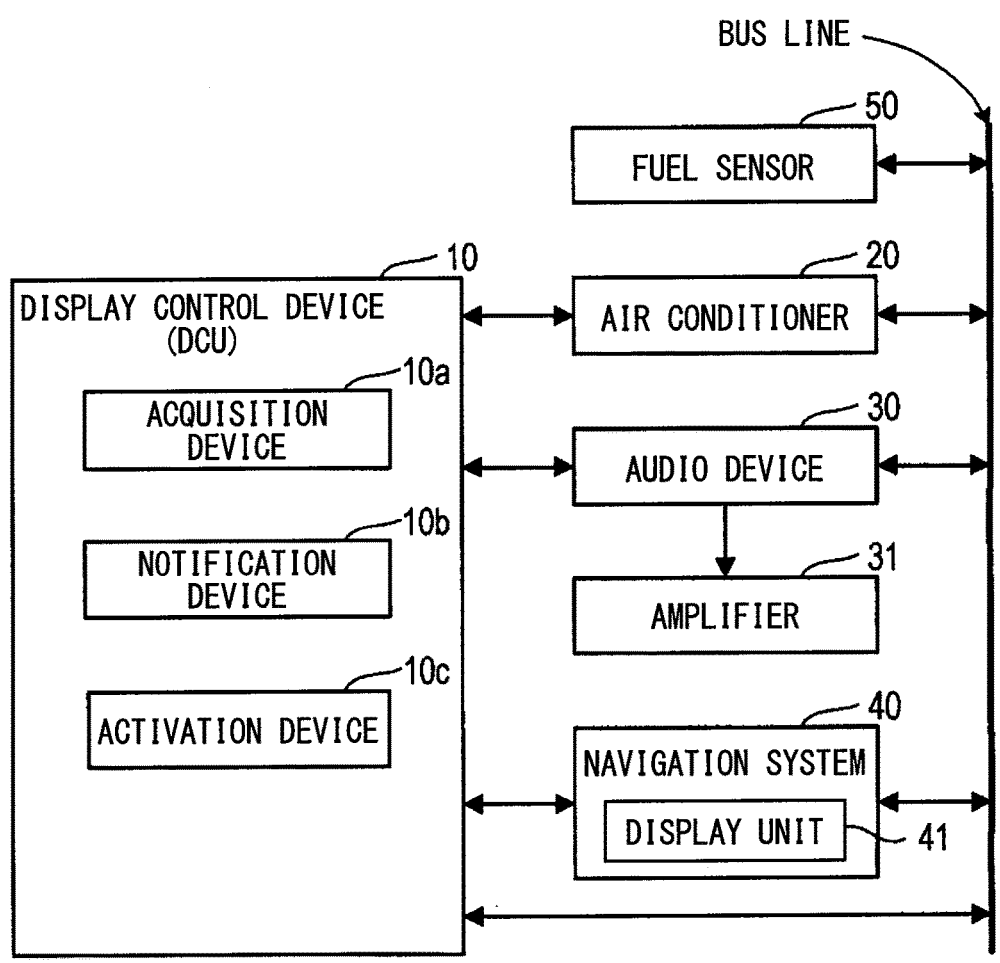
FIG. 1 is a block diagram illustrating a peripheral configuration including a display control device.

As illustrated in FIG. 1, a display control device (DCU) 10 according to this embodiment is a domain control unit that integrates hardware and software together, and is connected to an air conditioner 20, an audio device 30, and a navigation system 40. The display control device 10 is connected to a fuel sensor 50 through a bus line. The air conditioner 20, the audio device 30, and the navigation system 40 are also connected to the bus line, and can receive information on the bus line. The audio device 30 is connected with an amplifier 31, and can output a sound through a speaker not shown. The navigation system 40 has a display unit 41 formed of a color liquid crystal display.

With the above configuration, the display control device 10 can display an air conditioning setting screen or an audio setting screen on the display unit 41 of the navigation system 40. When an example of the air conditioning setting screen is applied, the display control device 10 performs room temperature setting on the basis of an input from a touch panel integrated with the display unit 41, or outputs an outside temperature to the air conditioner 20 on the basis of an outside air temperature sensor not shown.

Figure 2:
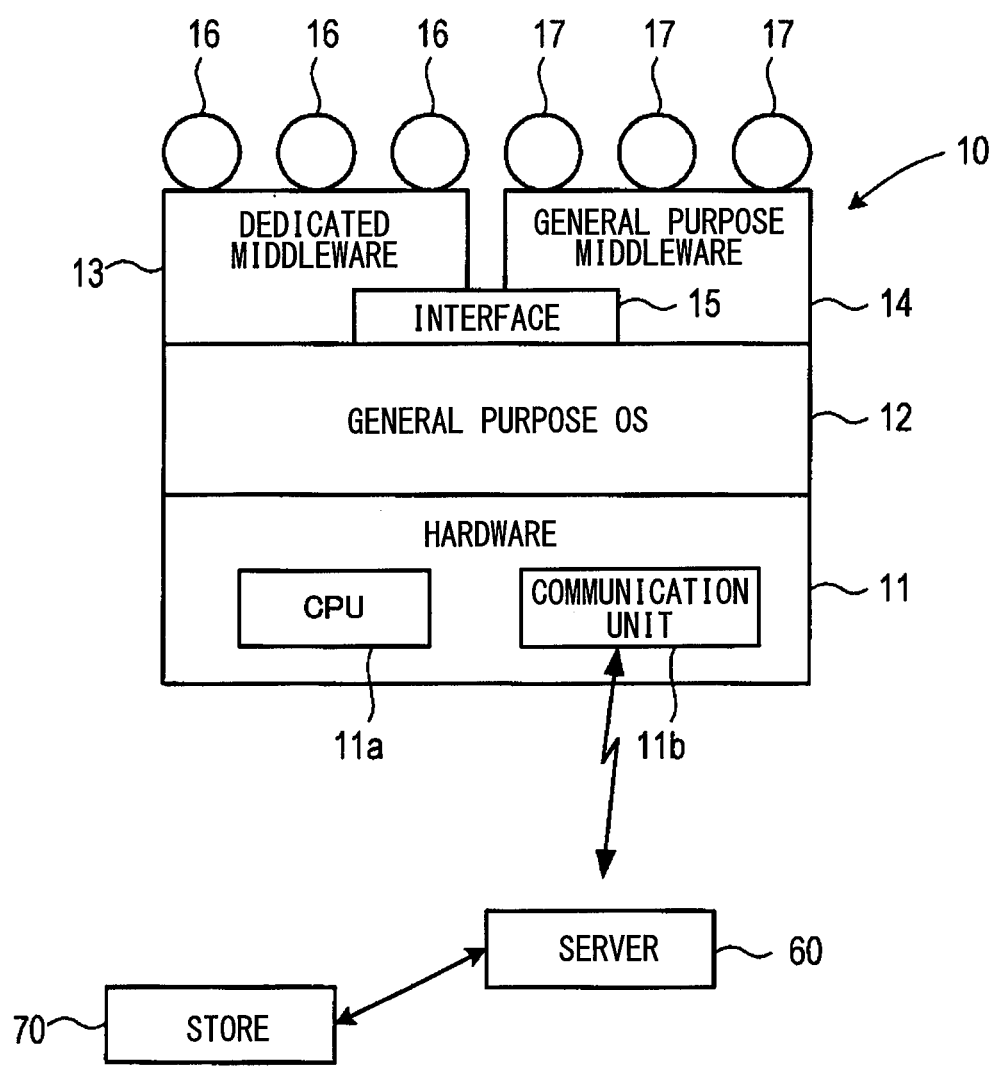
FIG. 2 is an illustrative view illustrating configurations of hardware and software in the interior of the display control device.

As illustrated in FIG. 2, the display control device 10 includes hardware 11, a general purpose OS 12, dedicated middleware 13, general purpose middleware 14, an interface 15, an application 16 that operates on the dedicated middleware 13, and an application 17 that operates on the general purpose middleware 14.

The hardware 11 includes a CPU 11a and a communication unit 11b. The CPU 11a is a controller that allows the general purpose OS 12, the dedicated middleware 13, the general purpose middleware 14, the interface 15, and the applications 16, 17 to function. The communication unit 11b is configured to enable a data communication with a server 60, and can download the application 17 from a store 70 which is a providing destination of the application through a network.

The general purpose OS 12 is a so-called platform located in an upper level of the hardware 11. The dedicated middleware 13 and the general purpose middleware 14 operate on the general purpose OS 12. The interface 15 is interposed between the dedicated middleware 13 and the general purpose middleware 14. The interface 15 is configured to enable an exchange of only necessary information.

Figure 3:
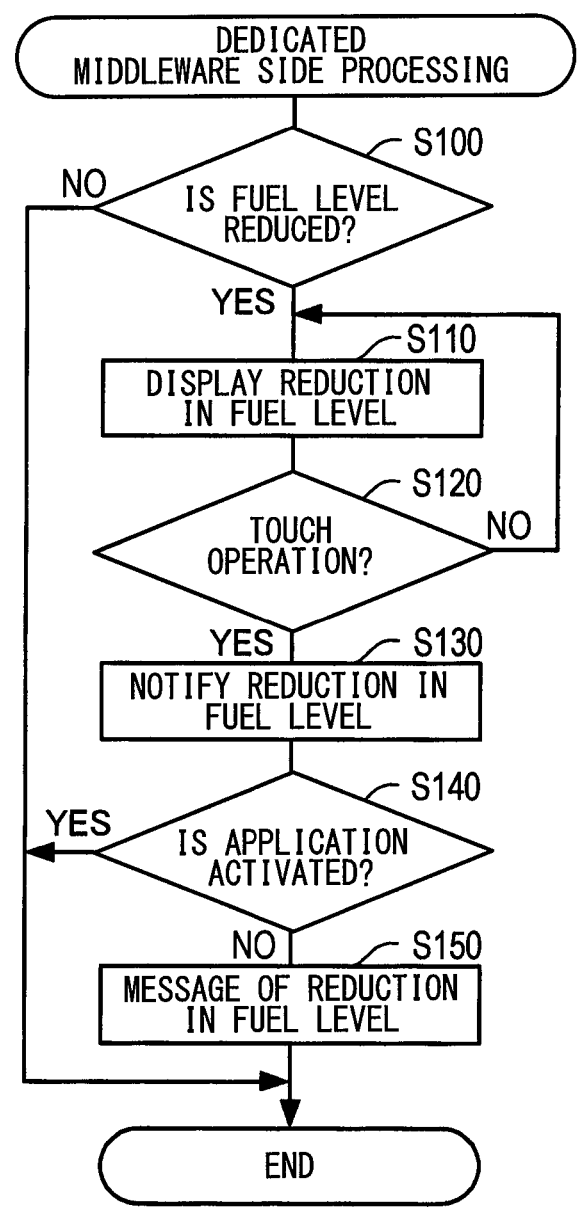
FIG. 3 is a flowchart illustrating a process on a dedicated middleware side.

Subsequently, processing on the dedicated middleware side will be described with reference to a flowchart of FIG. 3. The dedicated middleware side processing is repetitively executed at predetermined time intervals.

In first S100, it is determined whether a fuel level is reduced, or not. The processing is based on a signal from the fuel sensor 50. If it is determined that the fuel level is reduced (yes in S100), the processing proceeds to S110. On the other hand, if it is determined that the fuel level is not reduced (no in S100), the dedicated middleware side processing is terminated without execution of the subsequent processing.

Figure 5A:
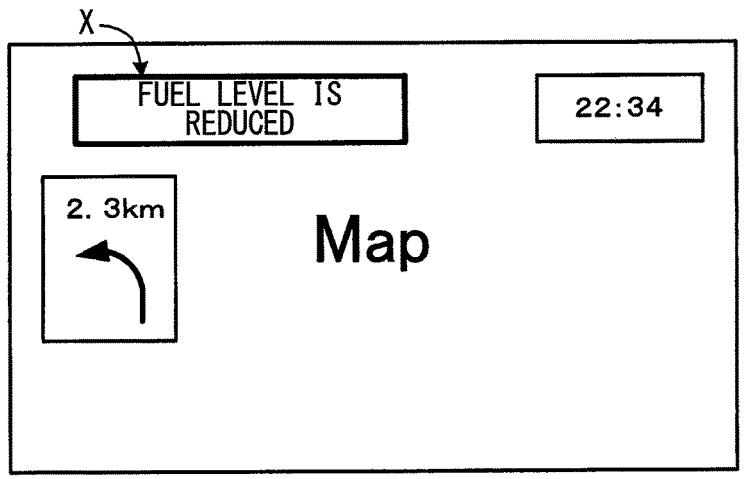
FIGS. 5A to 5C are illustrative views illustrating display examples on a display unit.

In S110, a reduction in the fuel level is displayed. As an example, in a state where the navigation system 40 functions, as indicated by a symbol X in FIG. 5A, a display that "fuel level is reduced" is superimposed on a map display on the display unit 41.

In subsequent S120, it is determined whether touch operation corresponding to the display of the reduction in the fuel level is made, or not. For example, when a portion that "fuel level is reduced" displayed and superimposed on the map display is touched, an affirmative determination is made (refer to FIG. 5A). If it is determined that the touch operation has been made (yes in S120), the processing proceeds to S130. On the other hand, if the touch operation has not yet been made (no in S120), processing from S110 is repeated.

In S130, the reduction in the fuel level is notified to the general purpose middleware 14 side. The processing is to notify the reduction in the fuel level mainly through the interface 15. In response to the notification, an application for searching a gas station activates on the general purpose middleware 14 side. When that application activates, the fact is notified to the dedicated middleware 13 side.

Under the circumstance, in subsequent S140, it is determined whether the application activates, or not. If it is determined that the application does not activate (no in S140), a message of the reduction in the fuel level is displayed on the dedicated middleware 13 side in S150, and thereafter the dedicated middleware side processing is terminated. On the other hand, if it is determined that the application activates (yes in S140), the dedicated middleware side processing is terminated without execution of the processing in S150.

Figure 4:
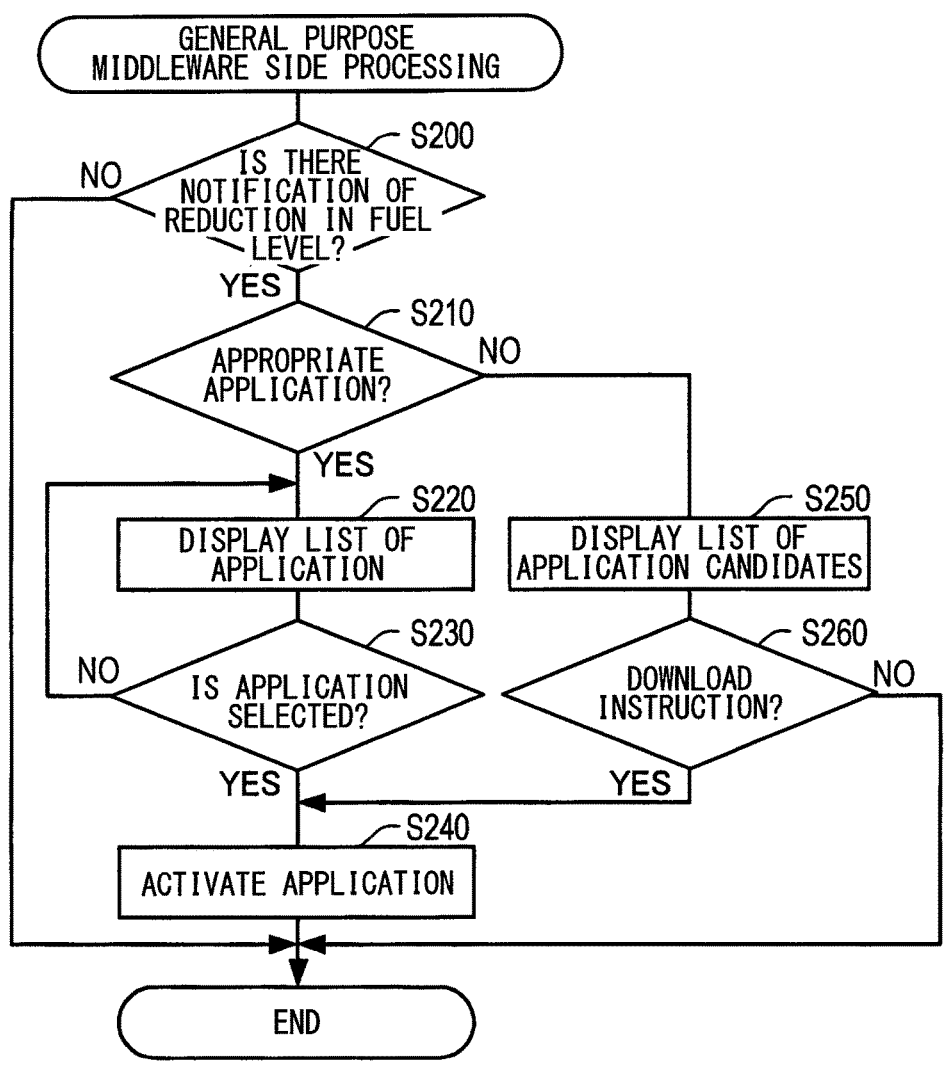
FIG. 4 is a flowchart illustrating a process on a general purpose middleware side.

Subsequently, the general purpose middleware side processing will be described with reference to a flowchart of FIG. 4. The general purpose middleware side processing is also repetitively executed at predetermined time intervals.

In first S200, it is determined whether there is a notification of the reduction in the fuel level, or not. The processing corresponds to S130 in FIG. 3. If it is determined that there is the notification of the reduction in the fuel level (yes in S200), the processing proceeds to S210. On the other hand, if it is determined that there is no notification of the reduction in the fuel level (no in S200), the general purpose middleware side processing is terminated without execution of the subsequent processing.

In S210, it is determined whether an appropriate application is installed, or not. In that case, it is determined whether the application for searching the gas station is installed, or not. If it is determined that there is the appropriate application (yes in S210), the processing proceeds to S220. On the other hand, if it is determined that there is no appropriate application (no in S210), the processing proceeds to S250.

Figure 5B:
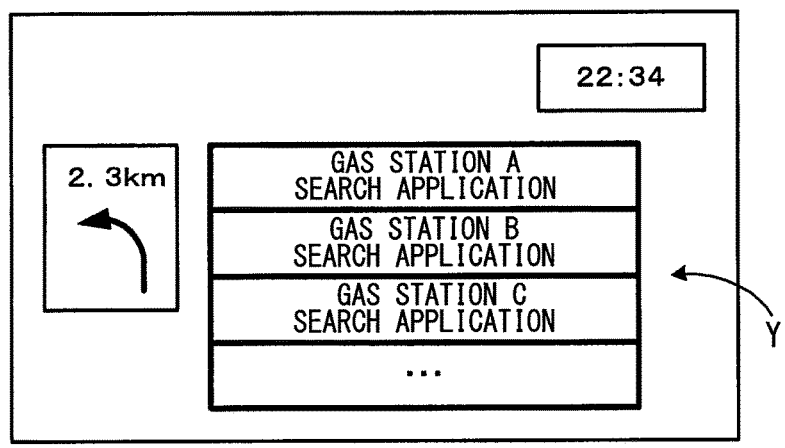

In S220, the applications are listed. For example, the applications are listed as indicated by a symbol Y in FIG. 5B. The installed gas station search applications are listed in such a manner that a gas station A search application, a gas station B search application, a gas station C search application, . . . are superimposed on the map display.

In subsequent S230, it is determined whether any application is selected, or not. The processing is to determine whether the gas station search application displayed in S220 has been selected from the list, or not. If it is determined that the application has been selected (yes in S230), the processing proceeds to S240. On the other hand, if the application has not yet been selected (no in S230), the processing from S220 is repeated.

In S240, the application activates. The processing is to activate the appropriate gas station search application. Upon activating the application, for example, a gas station located at a position close to a current position of a subject vehicle is searched, and displayed on the display unit 41 of the navigation system 40.

Figure 5C:
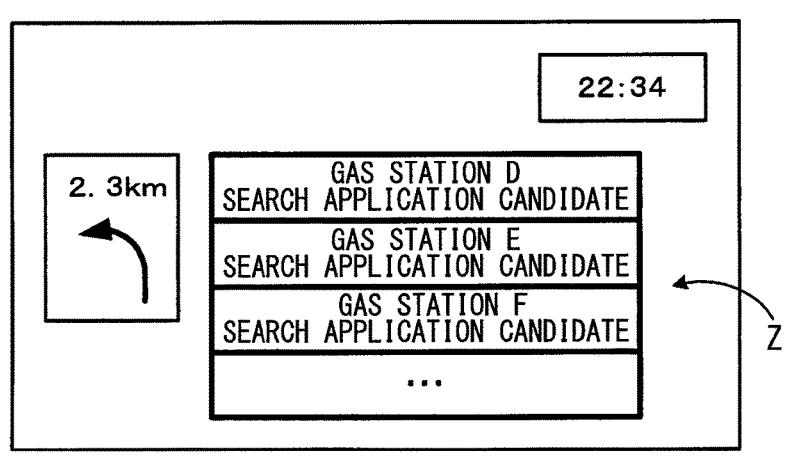

In S250 shifted when a negative determination is made in S210, the application candidates are listed. The processing is to search the appropriate application from the store 70 through the server 60 by the communication unit 11b, and list the searched result as the application candidates as indicated by a symbol Z in FIG. 5C.

In subsequent S260, it is determined whether there is a download instruction, or not. The processing is to determine whether the gas station search application candidate displayed in S250 is selected from the list, or not. If it is determined that there is the download instruction (yes in S260), the application activates in S240, and thereafter the general purpose middleware side processing is terminated. On the other hand, if it is determined that there is no download instruction (no in S260), the general purpose middleware side processing is terminated without execution of the processing in S240.

As described above in detail, the display control device 10 according to this embodiment includes the dedicated middleware 13, the general purpose middleware 14, and the interface 15, and controls the display on the display unit 41 of the navigation system 40. In this situation, the dedicated middleware 13 can execute the dedicated application 16 prepared on the vehicle side, and the general purpose middleware 14 can execute the general purpose application 17 delivered from the external. The interface 15 exchanges the required information between the dedicated middleware 13 and the general purpose middleware 14.

As described above, because not only the dedicated middleware 13 but also the general purpose middleware 14 for executing the general purpose applications 17 delivered from the external are mounted on the display control device 10, the general purpose applications 17 high in the frequency of release, and easy to delete or add can be used without connection to the mobile terminal, unlike the conventional art. Because the interface 15 is interposed, no failure occurs in the data communication due to the disturbance factor. Further, only the exchange of required information can be performed due to the interposition of the interface 15, and is advantageous in security.

In particular, in the dedicated middleware side processing, a signal from the fuel sensor 50 is acquired as the vehicle information, and if it is determined that the fuel level is reduced (yes in S100 of FIG. 3), the reduction in the fuel level as the vehicle status is notified to the general purpose middleware 14 side (S130). Further, in the general purpose middleware side processing, if the reduction in the fuel level is notified (yes in S200 of FIG. 4), the appropriate application 17 activates (S240).

In other words, the display control device 10 includes acquisition device 10a for acquiring the vehicle information associated with the vehicle on the dedicated middleware 13 side, notification device 10b for notifying the general purpose middleware 14 side of the vehicle status based on the vehicle information acquired by the acquisition device 10a through the interface 15, and activation device 10c for activating the target application 17 for realizing a display corresponding to the vehicle status among the general purpose applications 17 on the general purpose middleware 14 side on the basis of the vehicle status notified by the notification device 10b.

Further, the display control device 10 mounted on the vehicle can cooperate with the general purpose application 17.

Also, in this embodiment, if there are the appropriate applications 17 (yes in S210 of FIG. 4), one of those applications 17 selectively activates (S240). In other words, when a plurality of target applications 17 is installed in the activation device 10c, the activation device 10c selectively activates one of the target applications 17. That is, the application 17 that activates on the general purpose middleware 14 side is determined according to the notified vehicle status. As a result, the general purpose applications 17 flexibly activate such that a latest target application 17 activates.

The target application 17 to activate may be automatically selected. In this embodiment, the installed applications 17 are listed (S220 in FIG. 4), and when one of the applications 17 is selected by the user (yes in S230), the subject application 17 activates. In other words, the activation device 10c lists the target application 17, and when one of the listed target applications 17 is selected by the user, the selected target application 17 activates. Accordingly, the user can easily activate a desired application 17.

Furthermore, in this embodiment, if there is no appropriate application 17 (no in S210 of FIG. 4), the appropriate application is downloaded from the external, and activates (S240). In other words, if the target application 17 is not installed, the activation device 10c downloads the target application 17 from the external, and activates the target application 17. As a result, advantages obtained by using the general purpose application 17 in the display control device 10 are conspicuous.

The target application 17 may be automatically downloaded. In this embodiment, the target applications 17 that may become candidates are listed (S250 in FIG. 4), and if one of the applications 17 is selected by the user (yes in S260), the subject application 17 is downloaded, and activates (S240). In other words, when the target applications 17 are not installed, the activation device 10c lists the candidates of the target applications 17 acquirable from the external, and if one of the listed target applications 17 is selected, the activation device 10c downloads and activates the selected target application 17. As a result, the user can easily download and activate a desired application 17.

In this embodiment, the signal from the fuel sensor 50 is acquired as the vehicle information, and if it is determined that the fuel level is reduced (yes in S100 of FIG. 3), the fact is displayed (S110). If there is a user's touch operation responsive to that fact (yes in S120), the reduction in the fuel level as the vehicle status is notified to the general purpose middleware 14 side (S130). In other words, the notification device 10b displays the vehicle status based on the vehicle information acquired by the acquisition device 10a, and if there is the user's operation, the notification device 10b notifies the general purpose middleware 14 side of the vehicle status. As a result, the application 17 can activate only if the user desires.

As described above, the present disclosure is not limited to the above-mentioned embodiments, and can be implemented in various modes without departing from the technical scope of the present disclosure.

In the above embodiment, the reduction in the fuel level is determined on the basis of the signal from the fuel sensor 50 (S100 in FIG. 3), and if the fuel level is reduced (yes in S100), the reduction of the fuel level is notified to the general purpose middleware 14 side.

On the contrary, for example, a reduction in a tire pressure may be determined on the basis of a signal from a tire pressure sensor, and the reduction in the tire pressure may be notified to the general purpose middleware 14 side. In that case, it is conceivable that as in the above embodiment, the gas station search application may activate, or a dealer repair factory may be searched on the general purpose middleware side.

In other words, the associated target application may activate on the general purpose middleware 14 side on the basis of the vehicle status notified from the dedicated middleware 13 according to the vehicle information acquired on the dedicated middleware 13 side.

A path of the information exchange between the dedicated middleware 13 side and the general purpose middleware 14 side may be different depending on the capacity of information.

In other words, the exchange of data larger than a predetermined threshold is performed through the general purpose OS 12 once via the interface 15 from the respective middleware. On the other hand, the exchange of data smaller than the threshold is performed directly by the interface 15 not through the general purpose OS 12. With the above configuration, in the exchange of small data, rapidity is particularly ensured, and even in the exchange of large data, processing can be smoothly performed.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display control device for controlling a display of a display unit mounted in a vehicle, including a dedicated middleware that executes a program prepared on a vehicle side, a general purpose middleware that executes a plurality of general purpose application programs delivered from an external of the vehicle, and an interface that exchanges necessary information between the dedicate middleware and the general purpose middleware, the display control device comprising:
an acquisition device that acquires vehicle information associated with the vehicle on a dedicated middleware side;
a notification device that notifies a general purpose middleware side through the interface of a vehicle status based on the vehicle information acquired by the acquisition device;
an activation device that activates, on the general purpose middleware side, a target application program for realizing the display corresponding to the vehicle status among the general purpose application programs based on the vehicle status notified by the notification device; and
a general operating system, the dedicated middleware and the general purpose middleware being located on the general operating system, the dedicated middleware and the general purpose middleware being independent from each other, and the general operating system being a software operating system;
wherein:
exchange of the necessary information between the dedicated middleware and the general purpose middleware is performed through only the interface when an amount of the necessary information is lower than a predetermined threshold; and
the exchange is performed through both the general operating system and the interface when the amount of the necessary information is equal to or higher than the predetermined threshold.

2. The display control device according to claim 1, wherein:
when a plurality of target application programs are installed in the display control device, the activation device selects and activates one of the target application programs.

3. The display control device according to claim 2, wherein:
when the activation device controls the display unit to display a list of the plurality of target application programs, and one of listed target application programs is selected by a user, the activation device activates the selected target application program.

4. The display control device according to claim 1, wherein:
when the target application program is not installed in the display control device, the activation device downloads the target application program from the external of the vehicle, and activates the target application program.

5. The display control device according to claim 4, wherein:
when the target application program is not installed in the display control device, the activation device displays a list of candidates of a plurality of target application programs acquirable from the external of the vehicle; and
when one of listed target application programs is selected, the activation device downloads and activates the selected target application program.

6. The display control device according to claim 1, wherein:
the notification device together with the activation device control the display unit to display the vehicle status based on the vehicle information acquired by the acquisition device, and notifies the general purpose middleware side of the vehicle status when receiving an operation from an user.

7. A display control method for controlling a display of a display unit mounted on a vehicle, comprising:
acquiring vehicle information associated with a vehicle by a dedicated middleware that executes a program prepared on a vehicle side;
notifying a general purpose middleware, which executes a plurality of general purpose application programs delivered from an external of the vehicle, of a vehicle status based on the vehicle information through an interface;

exchanging necessary information between the dedicated middleware and the general purpose middleware through the interface; and activating a target application program, by the general purpose middleware, for realizing the display corresponding to the vehicle status among the general purpose application programs based on the vehicle status;

wherein the dedicated middleware and the general purpose middleware are located on a general operating system, the dedicated middleware and the general purpose middleware are independent from each other, and the general operating system is a software operating system; and wherein:

exchange of the necessary information between the dedicated middleware and the general purpose middleware is performed through only the interface when an amount of the necessary information is lower than a predetermined threshold; and the exchange is performed through both the general operating system and the interface when the amount of the necessary information is equal to or higher than the predetermined threshold.

\* \* \* \* \*